United States Patent
Saran et al.

(10) Patent No.: US 8,689,309 B2
(45) Date of Patent: Apr. 1, 2014

(54) AUTHENTICATION TOKEN FOR IDENTIFYING A CLONING ATTACK ONTO SUCH AUTHENTICATION TOKEN

(75) Inventors: Swami Saran, Meudon (FR); Yugant Bhargav, Meudon (FR)

(73) Assignee: Gemalto SA, Meudon (FR)

(*) Notice: Subject to any disclaimer, the term of this patent is extended or adjusted under 35 U.S.C. 154(b) by 861 days.

(21) Appl. No.: 12/278,057

(22) PCT Filed: Feb. 15, 2007

(86) PCT No.: PCT/IB2007/000392
§ 371 (c)(1),
(2), (4) Date: Aug. 1, 2008

(87) PCT Pub. No.: WO2007/096735
PCT Pub. Date: Aug. 30, 2007

(65) Prior Publication Data
US 2009/0177882 A1 Jul. 9, 2009

(30) Foreign Application Priority Data
Feb. 22, 2006 (IN) ................ 507/DEL2006

(51) Int. Cl.
*G06F 12/16* (2006.01)
*G06F 11/36* (2006.01)

(52) U.S. Cl.
USPC .................................. 726/9; 726/20

(58) Field of Classification Search
None
See application file for complete search history.

(56) References Cited

U.S. PATENT DOCUMENTS

| | | | |
|---|---|---|---|
| 5,347,580 A * | 9/1994 | Molva et al. | 713/159 |
| 6,393,126 B1 * | 5/2002 | van der Kaay et al. | 380/241 |
| 6,546,492 B1 * | 4/2003 | Walker et al. | 726/3 |
| 8,087,074 B2 * | 12/2011 | Popp et al. | 726/9 |
| 2002/0032859 A1 * | 3/2002 | Yoshizawa | 713/159 |
| 2005/0033995 A1 * | 2/2005 | Lin et al. | 713/202 |
| 2005/0138421 A1 * | 6/2005 | Fedronic et al. | 713/201 |
| 2006/0031899 A1 * | 2/2006 | Rabin et al. | 725/104 |
| 2006/0097037 A1 * | 5/2006 | Sakamura et al. | 235/380 |

FOREIGN PATENT DOCUMENTS

| | | |
|---|---|---|
| EP | 1605716 A | 12/2005 |
| EP | 1605716 A1 * | 12/2005 |
| EP | 1615456 A | 1/2006 |
| WO | WO0178306 A | 10/2001 |

OTHER PUBLICATIONS

Kaisa, Nyberg, "Cryptographic Algorithms for UMTS", Eccomas 2004, Proceedings, vol. II, 2004 [Online] Jul. 24, 2004-Jul. 28, 2004, pp. 1-18, XP002447245, Internet, Retrieved from http://www.tcs.hut.fi/Publications/kny/berg/eccomas.pdf, Retrieved on Aug. 17, 2008, p. 4-p. 5, p. 7-p. 8.

Al-Tawil, et al, "A new authentication protocol for roaming users in GSM networks", Computers and Communications 1999, Proceedings, IEEE International Symposium on Red Sea, Egypt Jul. 6-8, 1999, Los Alamitos, CA, US, IEEE Computer Society US, Jul. 6, 1999, pp. 93-99, XP010555022, ISBN 0-7695-0250-4, p. 93-p. 97.

* cited by examiner

*Primary Examiner* — Venkat Perungavoor
(74) *Attorney, Agent, or Firm* — The Jansson Firm; Pehr B. Jansson

(57) ABSTRACT

The invention relates to an authentication token for a communication network. The token may include a microprocessor, a memory, a stored secret key (Ki) and a set of instructions for controlling the microprocessor into performing an authentication calculation on the basis of a received random (RAND) and on the basis of the stored secret key. The token further includes a memory location dedicated for storing a counter value and it includes instructions for making the counter value evolve each time the authentication calculation is performed.

14 Claims, 1 Drawing Sheet

AUTHENTICATION TOKEN FOR IDENTIFYING A CLONING ATTACK ONTO SUCH AUTHENTICATION TOKEN

BACKGROUND OF THE INVENTION

1. Field of the Invention

The invention relates to personal tokens used for authentication in a telecommunication network such as a mobile telephony network.

The invention relates in particular to SIM cards or other personal tokens which are coupled with a mobile phone.

2. Description of the Related Art

The GSM fraud-prevention framework relies on special cryptographic codes to authenticate customers and bill them appropriately.

A personalized smartcard (called a SIM) in the cell phone stores a secret key usually referred to as "Ki" which is used to authenticate the customer. Knowledge of the key is sufficient to make calls billed to that customer.

The tamper-resistant smart card is supposed to protect the key from disclosure (even against adversaries which may have physical access to the SIM). Authentication is done with a cryptographic protocol in the card, which allows the SIM to "prove" knowledge of the key to the service provider, thus authorizing a call.

The COMP128 authentication algorithm, stored and run in the card is a function of the secret key Ki, and a random value Rand which is received from the remote server during the authentication process. The COMP128 algorithm is used for generating a result (SRES) as per the following equation:

$$SRES=COMP128(Ki,Rand).$$

As illustrated on FIG. 1, the result SRES as calculated by the SIM is then passed on by the handset to the Authentication Center AuC (the operator's remote server) in the GSM network and a similar authentication calculation is performed by the authentication center AuC.

The authentication center is enabled to perform such same calculation due to the fact that it stores the secret key Ki of the SIM card as well as the authentication algorithm which is used in the card. The result generated by the AuC is compared with the result generated by the SIM card, and if they match the SIM is authenticated to the network.

That is why gaining knowledge of the Ki would let a hacker clone the card.

To determine the Ki the hacker tries a multiple times to generate SRES using different Rand as mentioned above.

To obtain the Ki, a hacker would have to interact with the SIM repeatedly. After a sufficient number of queries with different allegedly random numbers, the attacker can use some mathematical technique to learn the secret key which has been used for producing the corresponding results.

An equation Func is used which relies on mathematical techniques of co-relation and regression, which function Func allows to derive the Ki:

$$Ki=Func(SRES,Rand)$$

On deriving the Ki the hacker can prepare a cloned SIM card and try to log in and attach to the network. Thus once the key is determined, the SIM card is hacked and it is possible to make fraudulent calls, which will be billed, to the original holder of the card.

The operator cannot detect that the card is cloned until the original holder informs the operator. This might lead to the continuation of fraud with the authentic holder not knowing that the fraud has occurred. If the GSM network operator knows that the fraud has actually occurred on a particular SIM an appropriate preventive action could be taken.

SUMMARY OF THE INVENTION

The aim of the invention is to identify when a SIM is subject to a cloning attempt. This identification can be done by the GSM network operator.

Such aim is achieved according to the invention thanks to the features as recited in the appended claims.

Other aspects and advantages of the invention will appear through the following detailed description, which is made in reference to the figures.

DETAILED DESCRIPTION OF THE INVENTION

Figure 1:
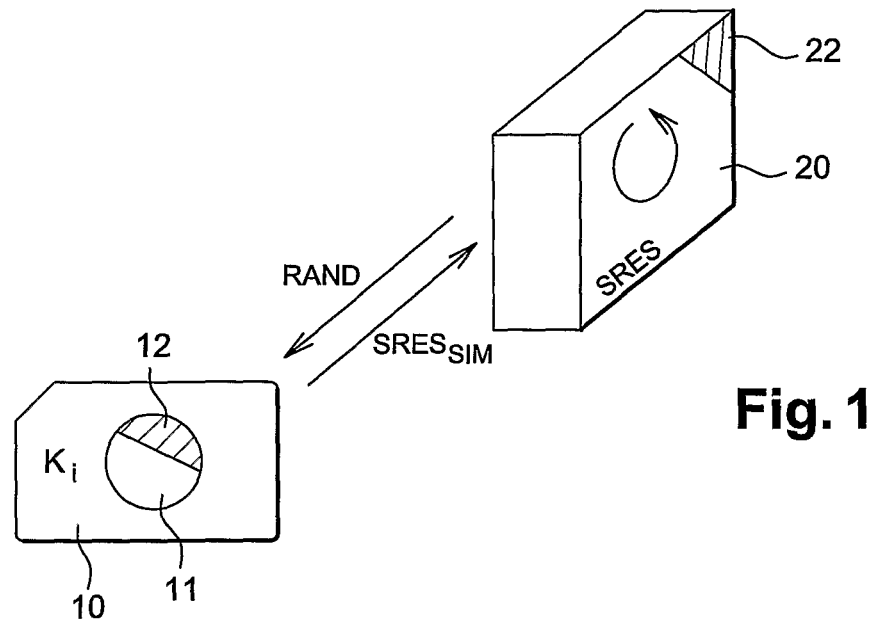
FIG. 1 is a diagram which partly depicts a mobile communication network according to the invention.
Figure 2:
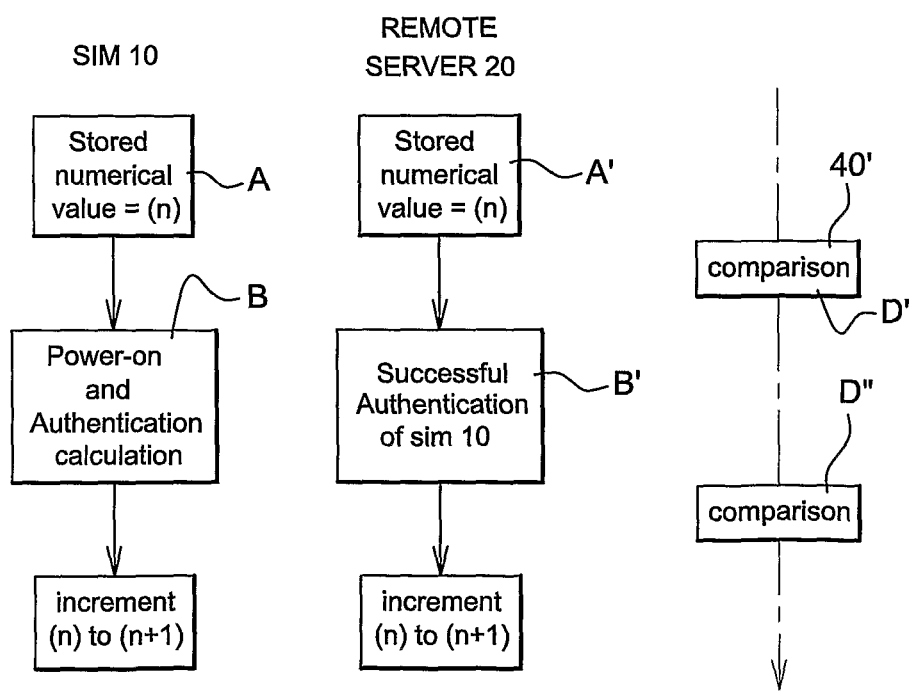
FIG. 2 is a diagram which depicts an authentication process of a SIM card in a mobile communication network, implementing a cloning detection process according to the invention.

A telecommunication network is partly depicted on FIG. 2, in which a SIM card 10 and an authenticating server 20 are represented which interact together so as to connect SIM card 20 into a telecommunication network.

The SIM card 10 includes a microprocessor 11 and a memory 12, said memory 12 comprising at least an element of the non-volatile type. Said memory comprises also typically a Read Only Memory element and a Random Access Memory element.

The microprocessor 11 executes algorithms which are stored either in the ROM element or in the non-volatile memory element. Those algorithms comprise an authentication algorithm which performs an authentication calculation of an expected result SRES on the basis of secret key Ki and on the basis of the random value RAND received from the remote server 20.

Non volatile memory element of the card 10 includes a special location for a storing a numerical value. The authentication algorithm interacts with said special location for incrementing the value stored in this location everytime an authentication is performed.

For example, if the numerical value stored at such location is n at a given time (step A), and the handset is powered on (step B), then an authentication is performed and the authentication algorithm increments the value n into value n+1 in the special location (step C).

Therefore, the value in such special location of the memory 12 of the SIM card 10 is a counter value which reflects the number of authentication calculations which have been performed by the SIM.

The remote server 20 includes an authentication algorithm which performs the same authentication calculation as the authentication calculation in the SIM card, with the same authentication algorithm based on the same secret key which is associated to the considered SIM card and based on the same random value RAND that the server simultaneously sends to the SIM card.

The server 20 also comprises a memory 22 and a special part in memory for the account of the holder of the considered SIM card, and said special part in memory comprises a special memory location for storing a changeable numerical value which is a counter value for reflecting the number of successfully occurred authentications with the considered card.

At the beginning of the life of the SIM card, i.e. when the SIM card is issued to the holder, the special memory locations in the server 20 and in the SIM card 10 are set at the same counter value, which may be zero (step A').

Each time an authentication is performed, the server 20 and the card 10 perform a calculation on the basis of the random value RAND which is specifically generated by the server 20 for such authentication.

The authentication server 20 then receives the $SRES_{SIM}$ value from the SIM card 10 and compares this $SRES_{SIM}$ value with its own calculated $SRES_{AUC}$.

If the comparison algorithm of the results $SRES_{SIM}$ and $SRES_{AUC}$ in the server 20 lets appear that these two values match together (step B') then the comparison algorithm increments the value stored in its counter 25 by the value of one (step C').

Therefore, in normal use of the SIM card 10, the special memory location in the server 20 and in the card 10 use to store the same counter values n, which become (n+1) almost simultaneously because such counter values use to increment at the same time.

The server 20 includes instructions for periodically performing (steps D', D") a comparison task between the values stored in the special memory locations of the SIM card 10 and of the server 20 itself.

After a predetermined periodic interval (for example once in a day or a month etc) the authentication server 20 sends an SMS with a specific keyword to the SIM card 10.

The SIM card 10 has a resident application which on receiving the SMS checks the password and if the password is correct then reads the authentication counter value from its EEPROM and sends it as an SMS to the authentication server 20. The server 20 on receiving this value compares it with its own counter value.

If they match then the server 20 deduces that no clone activity is present onto the SIM card 10. In the opposite case where the counter values of the SIM 10 and the server 20 mismatch then the comparison algorithm in the server 20 deduces that the authentication algorithm of the SIM card 10 has been actuated more frequently than the effective authentications with the server 20, and therefore that a hacking activity has been attempted onto the SIM card 10. In such case the server 20 then disables the account of the considered card holder and no more communication becomes possible with this account, thereby preventing a hacker to make use of the account of the considered card holder.

In an alternate embodiment, the server 20 runs an algorithm which periodically sends the current counter value of the server 20 to the SIM card 10. The SIM card runs an application which compares such received counter value with its own value and deduces whether both counter values match or not.

If the counter values don't match, then the application of the card 10 deduces that the authentication algorithm of the SIM card has been actuated more frequently than the effective authentications with the server, and therefore that a hacking activity has been attempted onto the SIM card. The application then raises an alarm to the holder of the card. The card holder can then inform the operator that his card if potentially subject to a hacking activity.

It should be understood that the remote server or server assembly is, in a preferred embodiment, constituted of a set of servers. Each server of the set covers a predetermined geographical area, these servers being linked together so as to host respective counters which are synchronized together to a same currently updated value. The said several servers may be servers which are linked together but which pertain to different national networks. In such case it still remains possible for the home operator to send and receive SMSs to and from the SIM card, the home operator thereby remains aware of whether the SIM card is attacked or not.

Mathematically, such comparisons can be summarized in the following manner:

Let the SIM card 0 which has to be cloned be named as SIM.

For SIM let the authentication counter value be 'SACV' (Sim Authentication Counter Value).

For SIM let the authentication counter value in the authentication server be 'ACACV' (Authentication Center Authentication Counter Value)

Since it is a genuine SIM and not yet cloned, SACV=ACACV.

After one authentication by the network SIM has the counter value as SACV+1.

And the authentication server has the counter value as ACACV+1.

Thus: SACV+1=ACACV+1, meaning the SIM A has not been attempted for a hack.

Assuming now that SIM is attempted for a cloning and the hacker hacked the SIM in 'N' tries. Then the authentication counter value in SIM is:

SACV+1+N

But since the network has not performed any authentication the authentication counter value in the server is still ACACV+1

On request by the server 20 or any other dedicated entity in the GSM network the SIM A sends the value 'SACV+1+N' as its counter value.

Since SACV+1+N is not equal to ACACV+1, it means SIM A is attempted for a cloning or a hack.

In another embodiment, the server 20 stores the number of times the authentication algorithm of the server has been performed, either successfully or not. The authentication algorithm of the server 20 increments the counter value associated with the given card in the server each time such algorithm of the server calculates the SRES value. The authentication algorithm of the server 20 performs such incrementing independently of the same expected result SRES value being received or not from the card.

In the same manner as described above, a comparison algorithm periodically or at each calculation for authentication, in the server or in the card, compares the counter values of the card and the server, thereby checking whether the authentication algorithm has been actuated the same number of times as the authentication algorithm of the server.

Both counter values should match. If there is a match the SIM card 10 has not been tried for a hack else the SIM card 10 might have been hacked.

Although the counter values are expected to perfectly match in the described examples, a given level of mismatch may be authorized.

For example the card should not be considered as being hacked if the compared counter value mismatch for less than a predetermined value. Such predetermined value should be chosen inferior to the necessary number of actuations of a card before deducing its secret key.

Although the counter values have been described as being incremented each time a corresponding calculation is performed, they may also be decremented departing from a same high original value.

Advantageously, the token comprises instructions which initiate disabling of the authentication token in the communication network by sending a message to the server assembly indicating the mismatch.

The token may also comprise instructions which initiate disabling of the authentication token in the communication network by disabling functionalities of the token.

When the server is set for disabling the token when necessary, the authentication token advantageously periodically sends its counter value to the remote server.

In an alternate embodiment, the server periodically sends the counter value to the remote authentication token.

The invention claimed is:

1. A remote authentication token for a communication network comprising:
   - a microprocessor;
   - a memory;
   - a secret key (Ki) stored in memory;
   - a counter value stored in a memory location; and
   - a set of instructions stored in memory:
     - for controlling the microprocessor into performing an authentication calculation on the basis of a received random value (RAND) and on the basis of the stored secret key;
     - for controlling the microprocessor to evolve the counter value each time the authentication calculation is performed according to an algorithm in common with an associated remote server wherein the evolution reflects that the authentication has been performed; and
     - for controlling the microprocessor of the authentication token into comparing the counter value as stored in the authentication token and a counter value as received from a remote server assembly and initiating a disabling of the authentication token in case the two counter values mismatch.

2. The remote authentication token according to claim 1, wherein the set of instructions initiating a disabling of the authentication token in case the two counter values mismatch comprises initiating disabling of the authentication token in the communication network.

3. The remote authentication token according to claim 1, wherein the instructions which initiate the disabling of the authentication token comprises instructions for sending a message to the remote server assembly indicating the mismatch.

4. The remote authentication token according to claim 1, wherein the instructions which initiate the disabling of the authentication token comprises instructions for disabling functionalities of the authentication token.

5. The remote authentication token according to claim 1, wherein the authentication token further comprises: instructions for controlling the microprocessor into periodically sending the counter value stored in the memory of the authentication token to the remote server assembly.

6. A server assembly for a communication network comprising:
   - a microprocessor;
   - a memory;
   - a stored secret key (Ki) associated to a remote authentication token;
   - a counter value stored in a memory location; and
   - a set of instructions for controlling the microprocessor into generating a random value (RAND) and additionally performing an authentication calculation on the basis of the random value (RAND) and the stored secret key (Ki), wherein the server assembly;
   - a set of instructions for controlling the microprocessor to evolve the counter value each time the authentication calculation is performed according to an algorithm in common with the remote authentication token;
   - a set of instructions for controlling the microprocessor of the server assembly into comparing the counter value stored in the memory location of the server assembly with a counter value received from the remote authentication token; and
   - a set of instructions for controlling the microprocessor into disabling an account of the holder in case the counter value as stored in the dedicated memory location of the server assembly and the counter value as received from the remote authentication token mismatch.

7. A method for detecting a hacking activity on a remote authentication token, said remote authentication token being able to communicate with a communication network, said remote authentication token comprising a microprocessor, a memory, a stored secret key (Ki), and a stored counter value, the method comprising operating the microprocessor to perform an authentication calculation on the basis of a received random (RAND) and on the basis of the stored secret key, to evolve said counter value each time the authentication calculation is performed, to exchange the counter value with a server that also evolves a corresponding counter upon each time the authentication calculation is performed, and to detect a hacking activity in case a mismatch occurs in the value of the counter and the corresponding counter evolved at the server.

8. The method according to claim 7, wherein the step to evolve the counter value is performed when the authentication successfully occurs.

9. The method according to claim 8, further comprising operating a processor in the server to execute an authentication algorithm in the server and operating the microcontroller in the token to execute an authentication algorithm, comparing the result of the authentication calculation made on the server with the result of the authentication calculation made on the token, wherein each of the authentication algorithms update respective counter values and considering success of the authentication when said counter values match.

10. The method according to claim 9, further comprising disabling an account of a holder in case the counter value stored in the server and the counter value received from the remote authentication token mismatch.

11. The method according to claim 9, further comprising controlling the microprocessor of the server assembly into periodically sending the counter value to the remote authentication token.

12. The method according to claim 11, further comprising controlling the microprocessor into raising an alarm if the received counter value from the server assembly does not match the counter value of the remote authentication token.

13. A remote authentication token for a communication network comprising:
   - a microprocessor;
   - a memory;
   - a secret key (Ki) stored in memory;
   - a counter value stored in a memory location; and
   - a set of instructions stored in memory:
     - for controlling the microprocessor into performing an authentication calculation on the basis of a received random value (RAND) and on the basis of the stored secret key;
     - for controlling the microprocessor to evolve the counter value each time the authentication calculation is performed according to an algorithm in common with an associated remote server wherein the evolution reflects that the authentication has been performed; and for controlling the microprocessor of the authentication token into transmitting the counter value as stored in the authentication token to a remote server assembly and initiating an alarm in case the two counter values mismatch.

14. The remote authentication token according to claim 13, wherein the authentication token further comprises: instructions for controlling the microprocessor into periodically sending the counter value stored in the memory of the authentication token to the remote server assembly.

* * * * *